(12) United States Patent
Schumacher et al.

(10) Patent No.: US 7,933,277 B1
(45) Date of Patent: Apr. 26, 2011

(54) METHOD AND APPARATUS FOR PROCESSING SCALABLE CONTENT

(75) Inventors: Paul R. Schumacher, Berthoud, CO (US); Robert D. Turney, Watertown, WI (US)

(73) Assignee: Xilinx, Inc., San Jose, CA (US)

( * ) Notice: Subject to any disclaimer, the term of this patent is extended or adjusted under 35 U.S.C. 154(b) by 604 days.

(21) Appl. No.: 11/433,126

(22) Filed: May 12, 2006

(51) Int. Cl.
  H04L 12/28 (2006.01)
  H04L 12/56 (2006.01)
(52) U.S. Cl. ......... 370/395.43; 326/37; 326/38; 326/39; 326/40; 326/41; 326/47
(58) Field of Classification Search ............ 370/395.42, 370/395.43
See application file for complete search history.

(56) References Cited

U.S. PATENT DOCUMENTS

| | | | |
|---|---|---|---|
| 2002/0135502 A1* | 9/2002 | Lu | 341/107 |
| 2004/0196972 A1* | 10/2004 | Zhu et al. | 380/45 |
| 2005/0129018 A1* | 6/2005 | Casaccia et al. | 370/390 |
| 2005/0185795 A1* | 8/2005 | Song et al. | 380/218 |
| 2005/0257186 A1* | 11/2005 | Zilbershlag | 716/18 |

OTHER PUBLICATIONS

Bobda et al., "The Erlangen Slot Machine: Increasing Flexibility in FPGA-based Reconfigurable Platforms," Dec. 2005, pp. 37-42, IEEE.*
Merino et al., "A Hardware Operating System for Dynamic Reconfiguration of FPGAs," 1998, pp. 431-435, vol. 1482, Springer Berlin Heidelberg.*
U.S. Appl. No. 11/076,797, filed Mar. 10, 2005 Schumacher et al.
U.S. Appl. No. 11/729,182, filed Mar. 27, 2007, Schumacher et al.
U.S. Appl. No. 11/729,206, filed Mar. 27, 2007, Schumacher et al.

* cited by examiner

*Primary Examiner* — Daniel J Ryman
*Assistant Examiner* — Jae Y Lee
(74) *Attorney, Agent, or Firm* — Robert M. Brush; LeRoy D. Maunu; Lois D. Cartier

(57) ABSTRACT

Method and apparatus for processing scalable content having a base layer and at least one enhancement layer is described. In one example, static logic having decoder logic and system monitor logic is provided. Programmable logic having a plurality of reconfigurable slots is also provided. The decoder logic includes a base layer processor for processing the base layer of the scalable content. The system monitor logic is configured to dynamically reconfigure at least one of the plurality of reconfigurable slots with at least one enhancement block for processing the at least one enhancement layer of the scalable content.

18 Claims, 4 Drawing Sheets

US 7,933,277 B1

METHOD AND APPARATUS FOR PROCESSING SCALABLE CONTENT

FIELD OF THE INVENTION

One or more aspects of the present invention relate generally to content processing systems and, more particularly, to a method and apparatus for processing scalable content.

BACKGROUND OF THE INVENTION

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, known as a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. An FPGA may also include various dedicated logic circuits, such as memories, digital clock managers (DCMs), and input/output (I/O) transceivers. Notably, an FPGA may include one or more embedded processors. The programmable logic of an FPGA (e.g., CLBs, IOBs, and interconnect structure) is typically programmed by loading a stream of configuration data (known as a bitstream) into internal configuration memory cells. The states of the configuration memory cells define how the CLBs, IOBs, interconnect structure, and other programmable logic are configured. Some FPGAs include support for run-time partial reconfiguration, which provides the ability to alter the behavior of portions of a circuit configured in an active FPGA. Partial reconfiguration is useful in systems that must support a wide range of optional behavior, only a subset of which is operational at any point in time.

FPGAs are suited for implementing circuits to process various types of content, such as compressed digital video data (moving picture experts group (MPEG) video streams), audio, multimedia, imaging, or the like. The latest trend in video coding is to provide various forms of scalability, sometimes all embodied within the same compressed video bitstream. Typically, this compressed data is provided in the form of a "base layer," as well as one or more "enhancement layers." A decoder system would be capable of creating a valid video output using just the base layer or the base layer and any combination of the enhancement layers. Exemplary types of scalability provided in the enhancement layers include: temporal scalability (i.e., frame rate), quality scalability (i.e., often measured by peak signal-to-noise ratio), and resolution scalability (i.e., frame size).

An example of this type of coder/decoder (codec) is embodied in the scalable video coding (SVC) development work currently ongoing under the auspices of the MPEG standards committee and the ISO/IEC Joint Video Team (JVT). SVC is an extension to the MPEG-4 Advanced Video Coding (AVC) standard (also known as MPEG-4, Part 10) jointly developed by the International Organization for Standardization (ISO) and International Telecommunication Union (ITU-T). The MPEG-4 AVC standard is published as ITU-T H.264 and ISO/IEC 14496-10. The proposed SVC codec provides all three of the aforementioned types of scalability (e.g., temporal, quality, and resolution) in labeled packets within the same bitstream. Either a smart network can be used to decide which types of packets to send to a particular end-user, or the end-user can receive the entire bitstream and only decode the packets that her or she is capable (authorized) of decoding.

One technique for providing the capability to process all layers in scalable content is to employ dedicated circuitry for processing the base layer and each possible enhancement layer. Thus, the decoder includes enhancement layer circuitry even if the end-user is not authorized to process certain enhancement layer(s), which impacts security. Accordingly, there exists a need in the art for a method and apparatus for processing scalable content that exhibits increased security.

SUMMARY OF THE INVENTION

Method and apparatus for processing scalable content having a base layer and at least one enhancement layer is described. In one embodiment, static logic having decoder logic and system monitor logic is provided. Programmable logic having a plurality of reconfigurable slots is also provided. The decoder logic includes a base layer processor for processing the base layer of the scalable content. The system monitor logic is configured to dynamically reconfigure at least one of the plurality of reconfigurable slots with at least one enhancement block for processing the at least one enhancement layer of the scalable content.

In another embodiment, scalable content is received. The base layer of the scalable content is processed. At least one enhancement block is identified. A programmable logic device is dynamically reconfigured with the at least one enhancement block for processing the at least one enhancement layer.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

Figure 1:
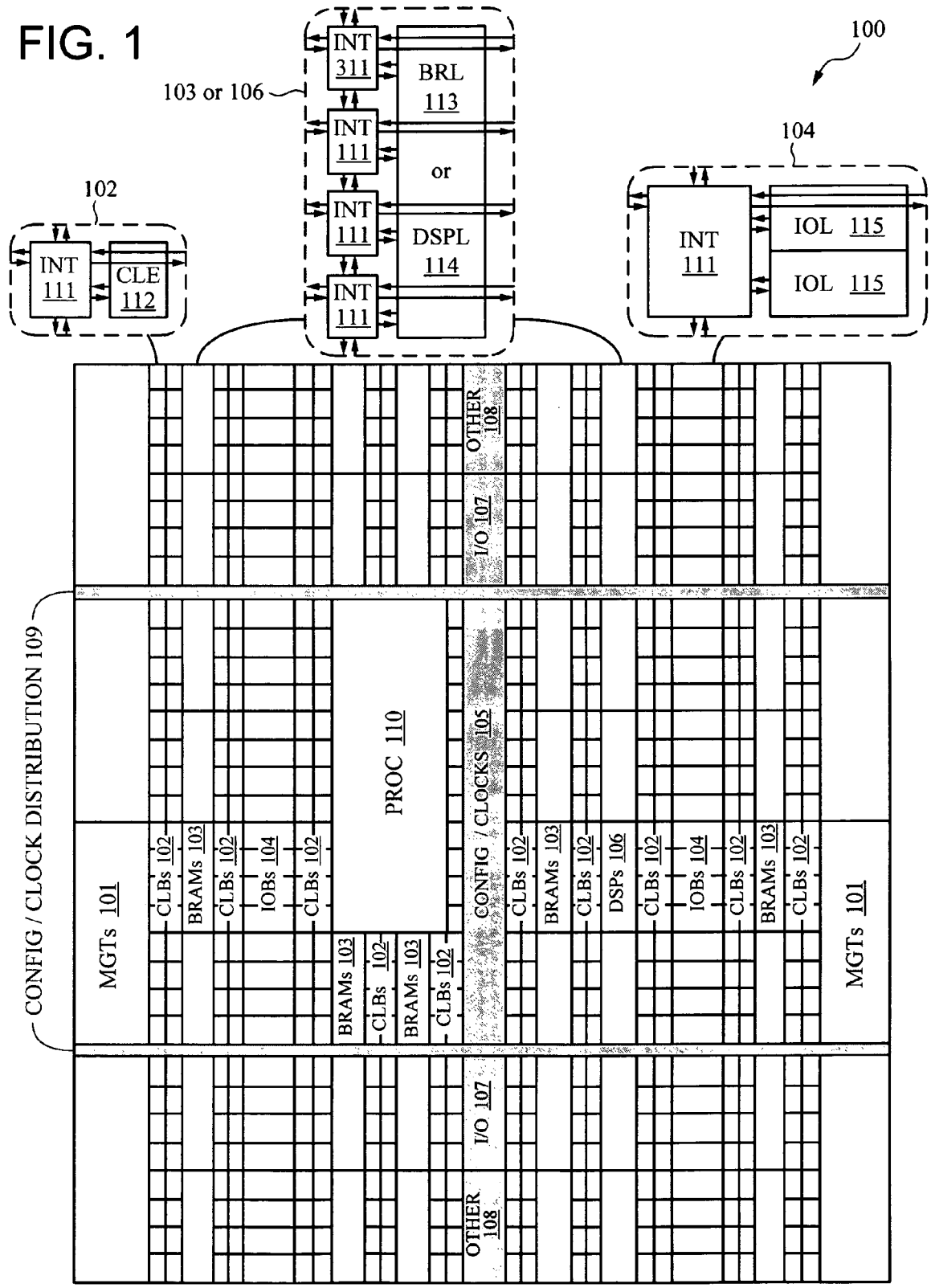
FIG. 1 illustrates an exemplary FPGA architecture.

FIG. 1 illustrates an FPGA architecture 100 that includes a large number of different programmable tiles including multi-gigabit transceivers (MGTs 101), configurable logic blocks (CLBs 102), random access memory blocks (BRAMs 103), input/output blocks (IOBs 104), configuration and clocking logic (CONFIG/CLOCKS 105), digital signal processing blocks (DSPs 106), specialized input/output blocks (I/O 107) (e.g., configuration ports and clock ports), and other programmable logic 108 such as digital clock managers, analog-to-digital converters, system monitoring logic, and so forth.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1.

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An 10B 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

The FPGA architecture 100 also includes one or more dedicated processor blocks (PROC 110). The processor block 110 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic (e.g., CLBs, IOBs). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art. The processor block 110 is coupled to the programmable logic of the FPGA in a well known manner.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA. Configuration information for the programmable logic is stored in configuration memory (not shown). The configuration logic 105 provides an interface to, and loads configuration data to, the configuration memory. A stream of configuration data ("configuration bitstream") may be coupled to the configuration logic 105, which in turn loads the configuration memory. Notably, the configuration logic 105 is configured to support the loading of partial configuration bitstreams while the FPGA is active. This allows for reconfiguration of portions of the FPGA during runtime. The configuration and reconfiguration process for the FPGA is well known in the art.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic.

The FPGA of FIG. 1 is capable of partial dynamic active reconfiguration while the FPGA is active via a partial reconfiguration process. A design configured in an FPGA may be divided into a static portion and one or more reconfigurable modules. A reconfigurable module is capable of being dynamically reconfigured while the FPGA is active. Once the target FPGA is active, a static portion is fixed and cannot be reconfigured. The partial reconfiguration process is well known in the art.

Figure 2:
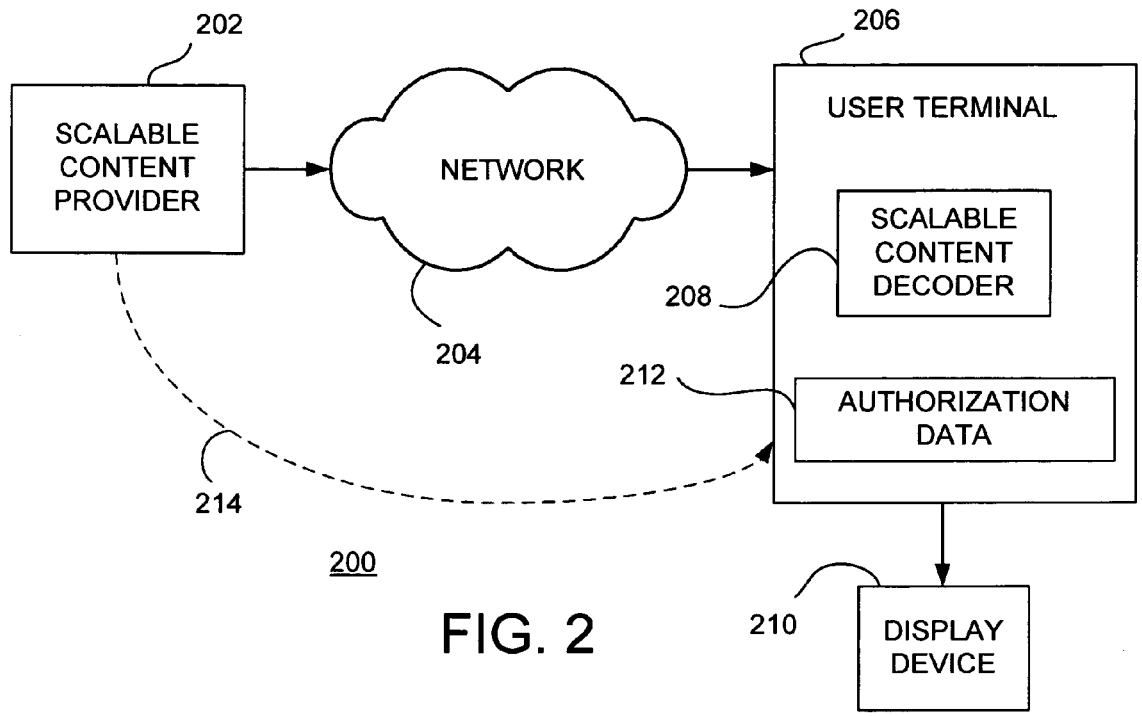
FIG. 2 is a block diagram depicting an exemplary embodiment of a scalable content processing system in accordance with one or more aspects of the invention.

FIG. 2 is a block diagram depicting an exemplary embodiment of a scalable content processing system 200 in accordance with one or more aspects of the invention. The system 200 includes a scalable content provider 202, a network 204, a user terminal 206, and a display device 210. The user terminal 206 includes a scalable content decoder 208. The scalable content provider 202 is configured to distribute scalable content to the STB 206 via the network 204. Scalable content provides multifaceted scalability by embodying different accessibility requirements and different display capabilities. In general, scalable content includes a base layer and one or more enhancement layers. Valid output may be produced by processing (decoding) only the base layer of the scalable content. Valid output may be produced by processing (decoding) the base layer and an enhancement layer or the base layer and a combination of enhancement layers. In one embodiment, the scalability provided by the enhancement layers may be temporal, quality-based, or resolution-based. Examples of scalable content include scalable video content (e.g., SVC extensions to AVC, as discussed above) and scalable audio content.

The user terminal 206 processes scalable content received from the network 204 for display on the display device 210. In particular, the user terminal 206 employs the scalable content decoder 208 to decoder the received scalable content. In one embodiment, the user terminal 206 also receives and stores authorization data 212 associated with the scalable content. In one embodiment, the user terminal 206 receives the authorization data 212 from the scalable content provider 202 via the network 204 or some other communication path 214. Alternatively, the user terminal 206 may be provisioned with the authorization data 212 during manufacture. In any case, the scalable content decoder 208 employs the authorization data 212 to determine which layer or layers of the scalable content are authorized for decoding. The authorization data can be updated dynamically over time by the scalable content provider 202 (e.g., based on changing authorization levels).

For example, the scalable content provider 202 may implement a tiered subscription service. The base layer of the scalable content may provide the least measure of quality and/or resolution (e.g., single-channel audio at low resolution or low-quality video). The user may subscribe to a higher tier of service whereby the user is authorized to decode one or more enhancement layers in the scalable content. Depending on the subscription tier, the accessible enhancement layers provide for content having increased quality and/or resolution as compared to the base layer. One or more layers in the scalable content may be protected using a conditional access mechanism (e.g., encryption). The authorization data may include key data for decrypting one or more of the layers.

In one embodiment, the scalable content provider 202 may provide the base layer and enhancement layer(s) to the user terminal 206 regardless of the particular level of authorization actually obtained by the user terminal 206. The enhancement layers may be protected using a conditional access mechanism (e.g., encryption) to prevent unauthorized decoding. Thus, even though the scalable content received by the scalable content decoder 208 includes all layers, the scalable content decoder 208 can only decode the layer(s) for which it is authorized by the authorization data 212. In another embodiment, the scalable content provider 202 may only distribute layers of the scalable content to the user terminal 206 for which the user terminal 206 is authorized.

The system 200 is merely exemplary. Those skilled in the art will appreciate that other types of systems may be employed to provide scalable content and/or authorization information to a user terminal. For example, the scalable content may be stored on storage media (e.g., a digital versatile disc (DVD) or compact disc (CD)) accessible by the user terminal 206. In general, the scalable content decoder 208 is configured to process scalable content for display via the display device 210.

Figure 3:
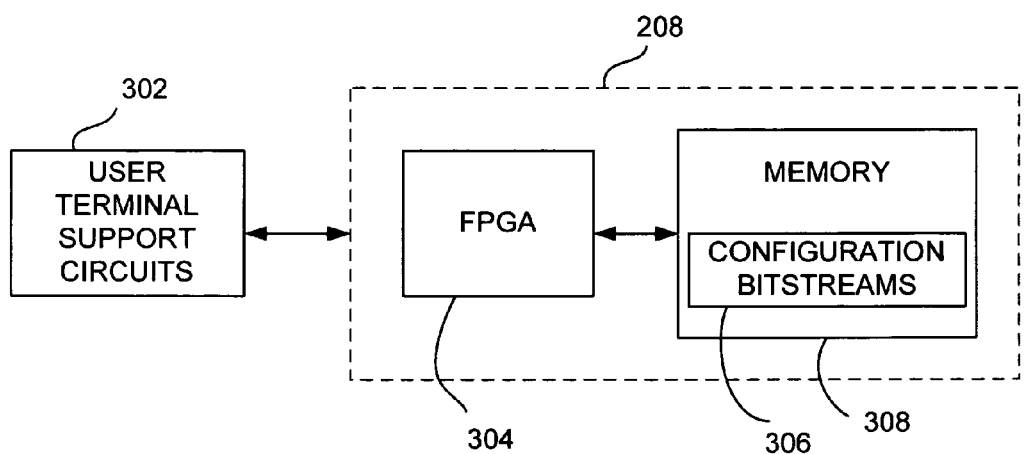
FIG. 3 is a high-level block diagram depicting an exemplary embodiment of a scalable content decoder in accordance with one or more aspects of the invention.

FIG. 3 is a high-level block diagram depicting an exemplary embodiment of the scalable content decoder 208 in accordance with one or more aspects of the invention. The scalable content decoder 208 includes an FPGA 304 and a memory ("external memory 306"). The external memory 306 is configured to store configuration data for the FPGA 304 and may comprise any type of memory known in the art. The FPGA 304 is coupled to user terminal support circuits 302. In another embodiment, rather than implementing the user terminal support circuits 302 using external logic, the user terminal support circuits 302 may be implemented within the FPGA 304. The user terminal support circuits 302 include various circuits for processing the scalable content received from the network 204, such as radio frequency (RF) processing circuits (e.g., a demodulator) and a memory for storing the authorization data 212. The user terminal support circuits 302 provide a scalable content stream to the FPGA 304 for processing. The user terminal support circuits 302 also provide the authorization data 212 to the FPGA 304.

Figure 4:
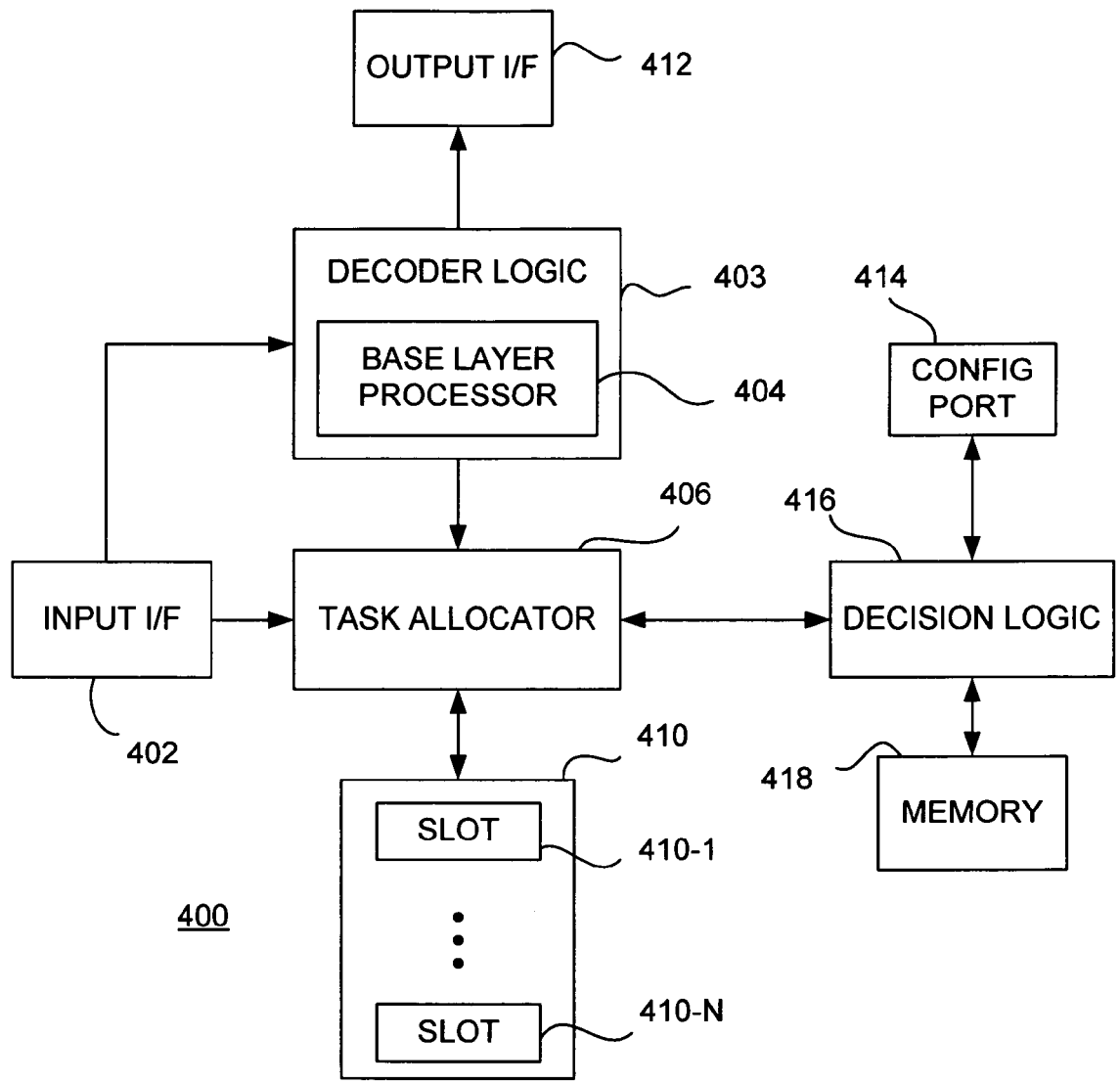
FIG. 4 is a block diagram depicting an exemplary embodiment of a scalable content decoder for implementation using an FPGA of FIG. 3 in accordance with one or more aspects of the invention.

FIG. 4 is a block diagram depicting an exemplary embodiment of a scalable content decoder 400 for implementation using the FPGA 304 of FIG. 3 in accordance with one or more aspects of the invention. The scalable content decoder 400 includes an input interface (I/F) 402, decoder logic 403, an output I/F 412, a task allocator 406, decision logic 416, a memory 418, and reconfigurable slots 410-1 through 410-N (collectively referred to as reconfigurable slots 410). The decoder 400 is configured within the FPGA 304 having a configuration port 414 coupled to the external memory 306. Briefly stated, the FPGA 304 may be dynamically reconfigured with different enhancement layer processing blocks ("enhancement blocks") using the reconfigurable slots 410. The enhancement blocks may be swapped in and out of the reconfigurable slots 410 based on authorization and as needed by the decoder 400 to process the scalable content.

In particular, the input I/F 402 is configured to receive a scalable content stream for decoding. The input I/F 402 provides the scalable content stream to the decoder logic 403. The decoder logic 403 includes a base layer processor 404 for processing the base layer of scalable content stream. The decoder logic 403 is coupled to the task allocator 406. In one embodiment, the task allocator 406 is configured to inform the decoder logic 403 of the particular enhancement layer(s) (if any) that are authorized for decoding. If no enhancement layers are authorized, the only the base layer processor 404 is used to process the scalable content stream. The decoder logic 403 provides decoded output to the output I/F 412, which displays the decoded output on a display. Notably, it is assumed that the decoder 400 is authorized to process the base layer of the scalable content stream. If specific authorization is required to process the base layer, the task allocator 406 can inform the decoder logic 403 of such authorization.

The input I/F 402 is configured to receive authorization data associated with scalable content. The input I/F 402 provides the authorization data to the task allocator 406. The task allocator 406 forwards the authorization data to the decision logic 416. If the authorization data is encrypted for protection, the task allocator 406 decrypts the authorization data before forwarding the data to the decision logic 416. The authorization data includes subscription tier information that dictates which enhancement layer(s) in the scalable content are authorized for decoding (if any). The decision logic 416 identifies which enhancement block(s) are configured in the reconfigurable slots 410 and which enhancement block(s) are required based on the authorization data. If one or more enhancement blocks are needed, the decision logic queries the memory 418 for information related to the required enhancement block(s).

The memory 418 is configured to store addresses of partial bitstreams in the external memory 306 associated with various enhancement blocks. The memory 418 may also store other types of information associated with the enhancement blocks, such as length of their partial bitstreams and their slot compatibility. "Slot compatibility" refers to the number of the slots 410 required by a given enhancement block. Notably, some enhancement blocks may occupy a single one of the slots 410 after configuration. Other enhancement blocks may occupy more than one of the slots 410 after configuration. Yet other enhancement blocks may be small enough such that multiple of these enhancement blocks may occupy a single one of the slots 410.

Having obtained the information from the memory 418 for the required enhancement block(s), the decision logic 416 invokes the partial reconfiguration process for the FPGA 304 via the configuration port 414. The decision logic 416 passes along the address(es) and size(s) of the partial bitstream(s) needed to the partial reconfiguration process. The end result of the partial reconfiguration process is that the required enhancement block(s) are configured in the slots 410. In one embodiment, the decision logic 416 forwards a retrieved partial bitstream to the task allocator 406 for "post-processing." For example, the task allocator 406 may shift the partial bitstream to be compatible with the actual slot location to which the partial bitstream is being targeted.

A standardized application programming interface (API) is provided for interfacing the enhancement blocks with the task allocator 406. The task allocator 406 keeps track of the processing capabilities of the configured enhancement blocks in the slots 410. In one embodiment, a dynamic handshaking protocol is employed for each of the enhancement blocks to inform the task allocator 406 of its processing capabilities and current status (e.g., ready for new data, almost done, busy, etc.).

When one or more enhancement layers are authorized for decoding, the task allocator 406 indicates the authorized enhancement layer(s) to the decoder logic 403. The decoder logic 403 provides data to and receives data from the enhancement block(s) via the task allocator 406. The task allocator 406 provides data to and receives data from the enhancement blocks using the API. In this manner, the decoder logic 403 may make use of the enhancement block(s) configured in the slots 410 for processing the authorized enhancement layer(s) in the scalable content stream. The decoded content (base layer and enhancement layer(s)) is provided to the output I/F 412 for display.

In one embodiment, the partial bitstreams stored in the external memory 306 for the enhancement blocks are encrypted for security. The authorization data received by the task allocator 406 further includes encryption key data for decrypting the partial bitstreams. The task allocator 406 provides the encryption key data to the decision logic 416 so that the partial bitstreams can be decrypted and the appropriate enhancement blocks can be loaded.

Processing the base layer and all enhancement layers may require significant FPGA resources. In some cases, a given FPGA might not be large enough to include the circuits for processing the base layer and all enhancement layers. In other cases, a given FPGA may be large enough, but all or most of the configurable logic is consumed. Thus, in one embodiment, the slots 410 are configured with enhancement blocks on a time-sharing basis based on what type of enhancement processing is needed within a particular time window. For example, for scalable video, the time window may span a group of frames as defined by the SVC extension of the AVC standard. Real-time partial reconfiguration is employed on a minimal number of slots 410 to reconfigure the slots 410 on a per-group of frames basis with the required enhancement blocks. Such an embodiment requires fewer FPGA resources, but requires a faster reconfiguration time.

While the task allocator 406 is shown as a separate block in FIG. 4, in another embodiment, the function performed by the task allocator 406 may be performed by the decoder logic 403. That is, the task allocator 406 may be part of the decoder logic 403. In another embodiment, the decision logic 416 may be part of the task allocator 406 (which in turn may be part of the decoder logic 403).

In one embodiment, the task allocator 406 is implemented using a processor embedded within the FPGA 304. The enhancement blocks configured in the slots 410 comprise hardware blocks in communication with the processor. The decision logic 416 receives instructions from the processor implementing the task allocator 406 to perform the reconfiguration function. An exemplary system for communication between a processor and a set of hardware blocks in a PLD is described in commonly-assigned U.S. patent application Ser. No. 11/076,797, filed Mar. 10, 2005, entitled "Method and Apparatus for Communication Between a Processor and Hardware Blocks", by Paul R. Schumacher, et. al., which is incorporated by reference herein.

Figure 5:
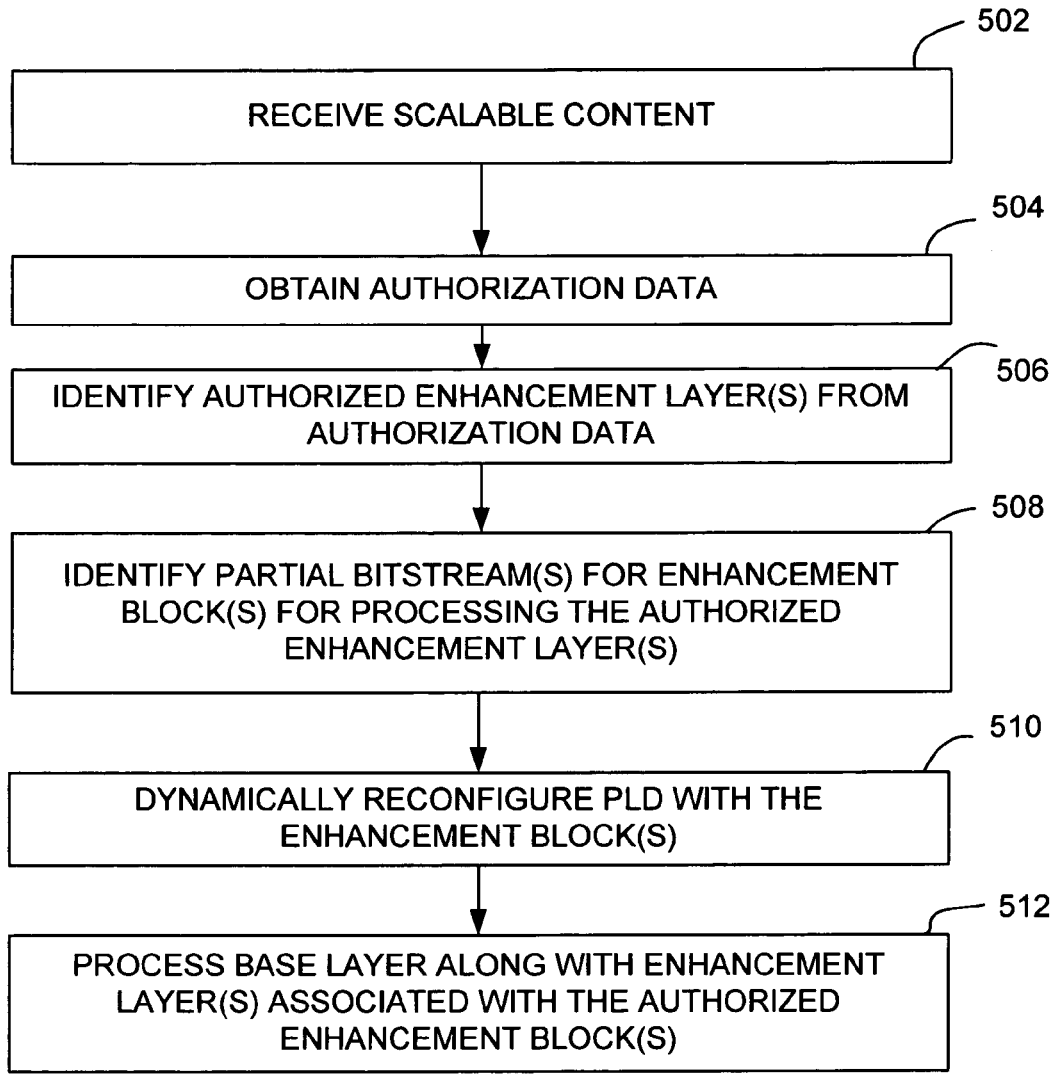
FIG. 5 is a flow diagram depicting an exemplary embodiment of a method for processing scalable content in a programmable logic device in accordance with one or more aspects of the invention.

FIG. 5 is a flow diagram depicting an exemplary embodiment of a method 500 for processing scalable content in a programmable logic device in accordance with one or more aspects of the invention. The method 500 begins at step 502, where scalable content is received. At step 504, authorization data is obtained. At step 506, at least one authorized enhancement layer of the enhancement layer(s) in the scalable content is identified from the authorization data. At step 508, at least one partial bitstream associated with at least one enhancement block for processing the authorized enhancement layer(s) is identified. At step 510, the programmable logic device is dynamically reconfigured with the at least one authorized enhancement block. At step 512, the base layer of the scalable content is processed along with enhancement layer(s) respectively associated with the at least one authorized enhancement block.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. Apparatus for processing scalable content having a base layer and at least one enhancement layer, comprising:
   static logic having decoder logic and system monitor logic;
   programmable logic having a plurality of reconfigurable slots;
   the system monitor logic include a task allocator and decision logic, the task allocator configured to obtain authorization data for the scalable content, the decision logic configured to:
   identify at least one enhancement block needed to process the scalable content based on the authorization data; and
   obtaining and decrypting at least one partial bitstream associated with the at least one enhancement block using encryption key data in the authorization data;
   the decoder logic having a base layer processor for processing the base layer of the scalable content; and
   the system monitor logic being configured to dynamically reconfigure at least one of the plurality of reconfigurable slots, using the at least one partial bitstream, to selectively include the at least one enhancement block for processing the at least one enhancement layer of the scalable content based on the authorization data.

2. The apparatus of claim 1, wherein:
   the task allocator is configured for communication with the decoder logic and the plurality of reconfigurable slots; and
   the decision logic is coupled to the task allocator and a configuration port of the programmable logic device.

3. The apparatus of claim 2, further comprising:
   a memory coupled to the decision logic, the memory being configured to store information associated with a plurality of enhancement blocks.

4. The apparatus of claim 2, further comprising:
   an input interface in communication with the task allocator and the decoder logic; and
   an output interface in communication with the decoder logic.

5. The apparatus of claim 1, wherein the system monitor logic is configured to communicate with the plurality of reconfigurable slots using an application programming interface (API).

6. The apparatus of claim 5, wherein the API is configured to track the processing capabilities of each enhancement block configured in the plurality of reconfigurable slots.

7. A system for processing scalable content having a base layer and at least one enhancement layer, comprising:
   a programmable logic device configured with a circuit having static logic and a plurality of reconfigurable slots, the static logic having decoder logic and system monitor logic, the decoder logic having a base layer processor for processing the base layer of the scalable content, the system monitor logic including a task allocator and decision logic, the task allocator configured to obtain authorization data for the scalable content, the decision logic configured to identify at least one enhancement block of a plurality of enhancement blocks needed to process the scalable content based on the authorization data; and a first memory, coupled to the programmable logic device, for storing partial bitstreams associated with the plurality of enhancement blocks;

wherein the decision logic is configured to obtain and decrypt at least one partial bitstream associated with the at least one enhancement block using encryption key data in the authorization data; and wherein the system monitor logic is configured to dynamically reconfigure at least one of the plurality of reconfigurable slots, using the at least one partial bitstream, to selectively include the at least one of the enhancement blocks for processing the at least one enhancement layer of the scalable content based on the authorization data.

8. The system of claim 7, wherein:

the task allocator is configured for communication with the decoder logic and the plurality of reconfigurable slots; and the decision logic is coupled to the task allocator and a configuration port of the programmable logic device.

9. The system of claim 8, further comprising:

a second memory coupled to the decision logic, the second memory being configured to store information associated with a plurality of enhancement blocks.

10. The system of claim 8, further comprising:

an input interface in communication with the task allocator and the decoder logic; and an output interface in communication with the decoder logic.

11. The system of claim 8, wherein the system monitor logic is configured to communicate with the plurality of reconfigurable slots using an application programming interface (API).

12. The system of claim 11, wherein the API is configured to track the processing capabilities of each enhancement block configured in the plurality of reconfigurable slots.

13. A method of processing scalable content having a base layer and at least one enhancement layer in a programmable logic device, comprising:

receiving the scalable content;

receiving authorization data;

processing the base layer of the scalable content;

identifying at least one enhancement block needed to process the scalable content based on the authorization data;

decrypting at least one partial bitstream associated with the at least one enhancement block using encryption key data in the authorization data; and dynamically reconfiguring the programmable logic device to selectively include the at least one enhancement block for processing the at least one enhancement layer using the at least one partial bitstream based on the authorization data.

14. The method of claim 13, wherein the step of identifying the at least one enhancement block comprises:

identifying at least one authorized enhancement layer of the at least one enhancement layer from the authorization data.

15. The method of claim 14, wherein the step of identifying the at least one enhancement block further comprises:

identifying at least one partial bitstream associated with the at least one authorized enhancement layer.

16. The method of claim 13, further comprising:

tracking processing capabilities of the at least one enhancement block.

17. The method of claim 16, wherein the step of tracking comprises:

employing a dynamic handshaking protocol.

18. The method of claim 13, wherein the programmable logic device is dynamically reconfigured with a plurality of enhancement blocks on a time-sharing basis.

* * * * *